United States Patent [19]
Cramer et al.

[11] 4,065,810
[45] Dec. 27, 1977

[54] DATA TRANSFER SYSTEM

[75] Inventors: Clark Evans Cramer, Raleigh, N.C.; John Richard Gaetjen, Saugerties; Carl Henry Grant, Woodstock, both of N.Y.; Paul Eugene Nelson; Frank Allen Newlin, III, both of Cary, N.C.

[73] Assignee: International Business Machines Corporation, Armonk, N.Y.

[21] Appl. No.: 762,686

[22] Filed: Jan. 26, 1977

[51] Int. Cl.² ............................................. G06F 3/00
[52] U.S. Cl. ................................................ 364/200
[58] Field of Search ............... 364/200 MS, 900 MS

[56] References Cited
U.S. PATENT DOCUMENTS

| 3,300,763 | 1/1967  | Hoehmann        | 364/900 |
| 3,408,631 | 10/1968 | Evans et al.    | 364/900 |
| 3,623,002 | 11/1971 | Mayne et al.    | 364/900 |
| 3,665,421 | 5/1972  | Rehhauser et al.| 364/200 |
| 3,704,453 | 11/1972 | Blackwell et al.| 364/200 |
| 3,740,728 | 6/1973  | Pullen          | 364/200 |
| 3,930,236 | 12/1975 | Ferguson et al. | 364/200 |

Primary Examiner—Harvey E. Springborn
Attorney, Agent, or Firm—John B. Frisone

[57] ABSTRACT

A method for accessing and storing data in randomly assigned storage locations in a memory associated with a processor under the control of external circuits connected to the processor I/O bus, said external circuits being provided with registers for storing several assigned addresses in the memory which contain the starting addresses in the memory of a control list stored in a plurality of sequential addresses and five or more storage areas, each including a plurality of contiguous storage locations and further provision being made within the said processor for incrementing the addresses stored in the said assigned addresses each time they are accessed for performing a reading or writing operation in the memory location designated therein.

2 Claims, 18 Drawing Figures

FIG. 3

POINTER REGISTERS

| 4 | |
|---|---|
| 6 | |
| 8 | 2056 |

MEMORY (TRANSMIT CONTROL BLOCK) STARTING ADD. 2056

| | | |
|---|---|---|
| 1 | | 1048 |
| 2 | 12 | 2 |
| 3 | | 256 |
| 4 | 0 | 2 |
| 5 | | 512 |
| 6 | 1 | 9 |
| 7 | | 524 |
| 8 | 0 | 2 |
| 9 | | 536 |
| 10 | 0 | 9 |
| 11 | | 1024 |
| 12 | 3 | 12 |
| 13 | | 1200 |
| 14 | | 1216 |
| 15 | | 1400 |

DATA SA'S

256

| 1 | A |
|---|---|
| 2 | C |

524

| 1 | A |
|---|---|
| 2 | C |

512

| 1 | 1 |
|---|---|
| 2 | 2 |
| 3 | 3 |
| 4 | 4 |
| 5 | 5 |
| 6 | 6 |
| 7 | 7 |
| 8 | 8 |
| 9 | 9 |

536

| 1 | 9 |
|---|---|
| 2 | 8 |
| 3 | 7 |
| 4 | 6 |
| 5 | 5 |
| 6 | 4 |
| 7 | 3 |
| 8 | 2 |
| 9 | 1 |

DATA SA 1024

| 1 | D |
|---|---|
| 2 | E |
| 3 | Z |
| 4 | G |
| 5 | H |
| 6 | I |
| 7 | J |
| 8 | K |
| 9 | L |
| 10 | M |
| 11 | N |
| 12 | O |
| 13 | Q |
| 14 | R |
| 15 | S |
| 16 | T |
| 17 | U |
| 18 | V |

DATA SA 1048

| 1 | 55 |
|---|---|
| 2 | 55 |

FIG. 4

POINTER REGISTERS

| 4 | 1200 |
|---|------|
| 6 | 1216 |
| 8 | 1400 |

MEMORY
RCV CONTROL BLOCK
STARTING ADD. 1400

| | | | |
|---|---|---|---|
| 1 | 02 | 6 | 3 |
| 2 | 0 | | 00 |
| 3 | 03 | | 00 |
| 4 | 02 | 6 | 4 |
| 5 | | | |
| 6 | | | |
| ⋮ | | | |
| 16 | | | |

R1 SA 1200

| 1 | A (L) |
|---|-------|
| 2 | C (M) |
| 3 | 1 (N) |
| 4 | 2 (O) |
| 5 | 3 (Q) |
| 6 | 4 (R) |
| 7 | 5 (S) |
| 8 | 6 (T) |
| 9 | 7 (U) |
| 10 | 8 (V) |
| 11 | 9 (B) |
| 12 | B (B) |
| 13 | B |
| 14 | A |
| 15 | C |
| 16 | 9 |

16 BYTES

R2 SA 1216

| 1 | 8 |
|---|---|
| 2 | 7 |
| 3 | 6 |
| 4 | 5 |
| 5 | 4 |
| 6 | 3 |
| 7 | 2 |
| 8 | 1 |
| 9 | D |
| 10 | E |
| 11 | Z |
| 12 | G |
| 13 | H |
| 14 | I |
| 15 | J |
| 16 | K |

FIG. 6

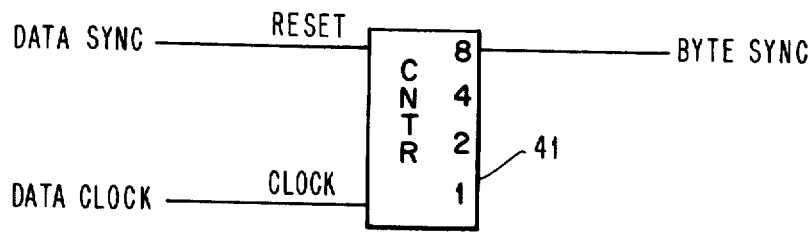

FIG. 7

1. IND = RX MODE · CSG · $\overline{IO}$ + A · $\overline{B}$ · CSG · $\overline{IO}$ · TX + A · B · CSG · $\overline{IO}$ · TX 2. RD = RX MODE · CSG · $\overline{IO}$ + A · $\overline{B}$ · CSG · $\overline{IO}$ · TX + A · B · CSG · $\overline{IO}$ · TX + $\overline{A}$ · B · CSG · $\overline{IO}$ · TX

FIG. 8

DEFINES WHEN ADAPTER GENERATES CS

CS = $\overline{IO}$ (BYTE SYNC · TX · $\overline{XMIT\ END}$ + [RX · (BYTE SYNC + DATA CNT = 0)] + FTA)

RECEIVE SEQUENCE

RXCS RD REG 1 = $\overline{\text{DATA CNT} = 0}$ · CSG · RX MODE · REG 1

RXCS RD DATA = $\overline{\text{DATA CNT} = 0}$ · TD · RX MODE

RXCS RD REG 2 = $\overline{\text{DATA CNT} = 0}$ · CSG · RX MODE · REG 2

RXCS RD REG 3 = (DATA CNT = 0 + BYTE SYNC) · RX MODE · CSG

RXCS RD REG 4 = (DATA CNT = 0 + BYTE SYNC) · RX MODE · TD

FIG. 11

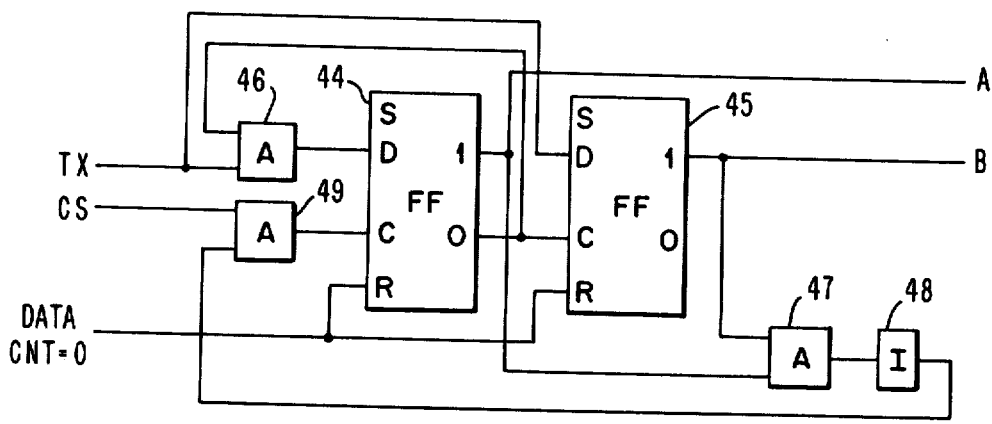

FIG. 12

TXCS RD REG 3 = A · $\bar{B}$ · CSG · IO · TX · $\overline{FTA}$ + (CSG · IO · TX · FTA)

TXCS WR REG 4 = A · $\bar{B}$ · TD · IO · TX

TXCS RD REG 4 = $\bar{A}$ · B · TD · IO · TX · $\overline{FTA}$

TXCS RD REG 1 = A · B · CSG · IO · TX · $\overline{FTA}$ + $\bar{A}$ · B · CSG · IO · TX · $\overline{FTA}$ TXCS WR DATA = A · B · TD · IO · TX · $\overline{FTA}$ TXCS WR REG 1 = A · $\bar{B}$ · TD · IO · TX · FTA TXCS WR REG 2 = $\bar{A}$ · B · TD · IO · TX · FTA TXCS WR REG 3 = A · B · TD · $\overline{IO}$ · TX · FTA

RD REG 1 = (TXCS RD REG 1) + (RXCS RD REG 1)

WR REG 1 = (TXCS WR REG 1)

RD REG 2 = (RXCS RD REG 2)

RD REG 3 = (TXCS RD REG 3) + (RXCS RD REG 3)

WR REG 3 = (RXCS WR REG 3)

RD REG 4 = (TXCS RD REG 4) + (RXCS RD REG 4)

WR REG 4 = (TXCS WR REG 4)

RD DATA = (RXCS RD DATA)

WR DATA = (TXCS WR DATA)

MEMORY CYCLE READ-INDIRECT

DATA TRANSFER SYSTEM

FIELD OF THE INVENTION

The invention relates to data processors in general and more particularly to a method and structure for transferring data from an external device such as a modem to a memory associated with the processor via an I/O bus and for transferring data stored in the memory to the said external device via the said I/O bus all under the control of external hardware connected between the said external device and the said I/O bus.

DESCRIPTION OF THE PRIOR ART

Conventional general purpose data processors utilize many different techniques for transferring data from main memory to connected devices and vice versa. In most instances some form of I/O channel processor interfaces the externally connected devices and performs the necessary transfers into and out of memory. This technique is not readily utilized in the case of a small low-cost micro processor utilized as a programmed controller for a terminal with communication capability since it would require more capability in the processor at increased cost or a reduction in the information throughput to compensate for the added function required.

SUMMARY OF THE INVENTION

The invention contemplates a method and structure for transferring data from a plurality of memory locations in a memory associated with a processor to an external device connected to the processor I/O bus and vice versa. The external device includes a plurality of registers which are set to contain addresses in the memory which contain pointers. For transferring data from the memory to the external device, the first pointer indicates the first address of a list which includes in sequence the first address of each block of stored data which is to be transferred and status information relative to said block. Said status information includes at least the length of each block. In sequence the external device by appropriate signal causes the processor to transfer the data stored at the location indicated by the first pointer to the external device and store the address portion of that data in the processor as the second pointer. Thereafter, the external device accesses the data indicated by the second pointer. The processor is arranged to increment the internally stored pointers each time the external device accesses the same and the external device decrements the data count received when it accesses the data pointed to by the first pointer until the count is exhausted and the above process is repeated. In this manner the blocks of data, stored in random locations in the memory, are accessed in sequence by the external device without program intervention in the processor. For transferring data from the external device to the memory, three addresses are stored in the registers of the external device. Each address defines an address in memory which contains a pointer address. The first pointer address initially defines a block of storage where the external device can create a table defining the status of the information transferred to the memory. The second and third pointer addresses initially contain the initial address of two fixed blocks of storage in the memory. At the beginning of a transfer, status information is stored in the table by accessing the first pointer and writing the status information in the table at the address defined by the first pointer. Data transfer is accomplished by accessing the second pointer register until the block associated with that pointer is filled. When the block is filled or when status changes, the first pointer is accessed to build the status table. The three pointers are incremented each time they are accessed, thus causing the table information and data to be placed in succeeding addresses. When the first data storage area is filled and the table updated with status, the external device accesses the third pointer to fill the second storage block. A control program not part of the invention monitors the status table and either transfers the data stored in a filled block and resets the second pointer or assigns a new block and changes the second pointer to point to the first address in the new block. Obviously, both types of transfers can take place simultaneously on an interleaved basis or may operate in one or the other mode. If full duplex operation is used, five registers must be provided in memory. If half duplex operation is used, a maximum of three registers and three pointers will suffice.

BRIEF DESCRIPTION OF THE DRAWINGS

FIGS. 3 and 4 are schematic illustrations of the memory contents under two different conditions; and FIGS. 5-18 are detailed diagrams of components illustrated in FIG. 2.

DESCRIPTION OF THE PREFERRED EMBODIMENT

Figure 1:
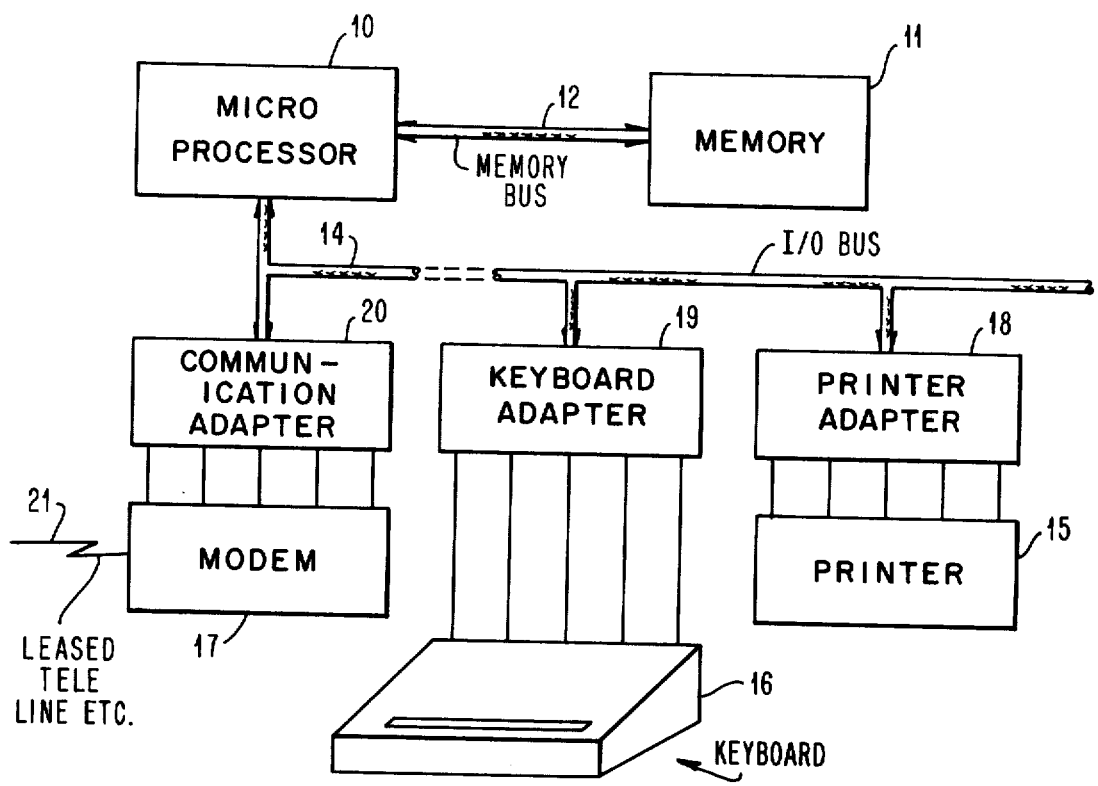
FIG. 1 is a block diagram illustrating a combination in which the subject invention may be utilized.

In FIG. 1 a programmed microprocessor based communicating I/O terminal is illustrated in block diagram form in order to illustrate one environment in which the invention is suitable for use. A microprocessor 10 is connected to a memory 11 by a memory bus 12. The memory 11 includes a control program, working storage registers and general storage registers for storing data.

The microprocessor 10 is provided with an I/O bus 14 for connecting the microprocessor to a variety of input and output devices such as a printer 15, a keyboard 16 and a modem 17. The I/O devices 15, 16 and 17 are physically connected to I/O bus 14 by adapters 18, 19 and 20, respectively. These adapters provide many functions which are primarily dictated by the nature of the device. For example, the printer adapter 18 may include a character generator designed to accommodate the particular printer used and thus convert a binary coded character designation supplied by the microprocessor into a plurality of time sequential control signals for causing the printer 15 to reproduce the character identified by the binary coded character supplied by the microprocessor. In the case of the communications adapter 20 a parallel to serial/serial to parallel conversion must be accomplished if data is to be transferred from the parallel I/O bus 154 to the serial telephone line 21 and vice versa. Since these particular conversion or control functions are well known and do not constitute part of this invention, they will not be further illustrated or described herein.

In a typical query answer-back application, an operator will compose a message at the keyboard 16. The query message will be inserted in the memory 11 and printed by printer 15 under the control of programs stored in the memory 11. After the operator has entered the query and verified the accuracy on the printed copy, he may transmit the message by actuating an appropriate key on the keyboard. The appropriate program in memory 11 will cause the stored data to be transmitted via the modem 17 to a remote computer via the telephone line 21. The remote computer will compose an answer to the query message and return the answer via the telephone line 21, the modem 17 and the adapter 20 to the processor 10 whereupon it will be stored in memory 11 for subsequent printing on printer 15, thereby providing the operator with the answer to his query. The IBM 3770 Communications Terminal types are substantially similar in function and organization to the communicating terminal described above and illustrated in FIG. 1.

Figure 2:
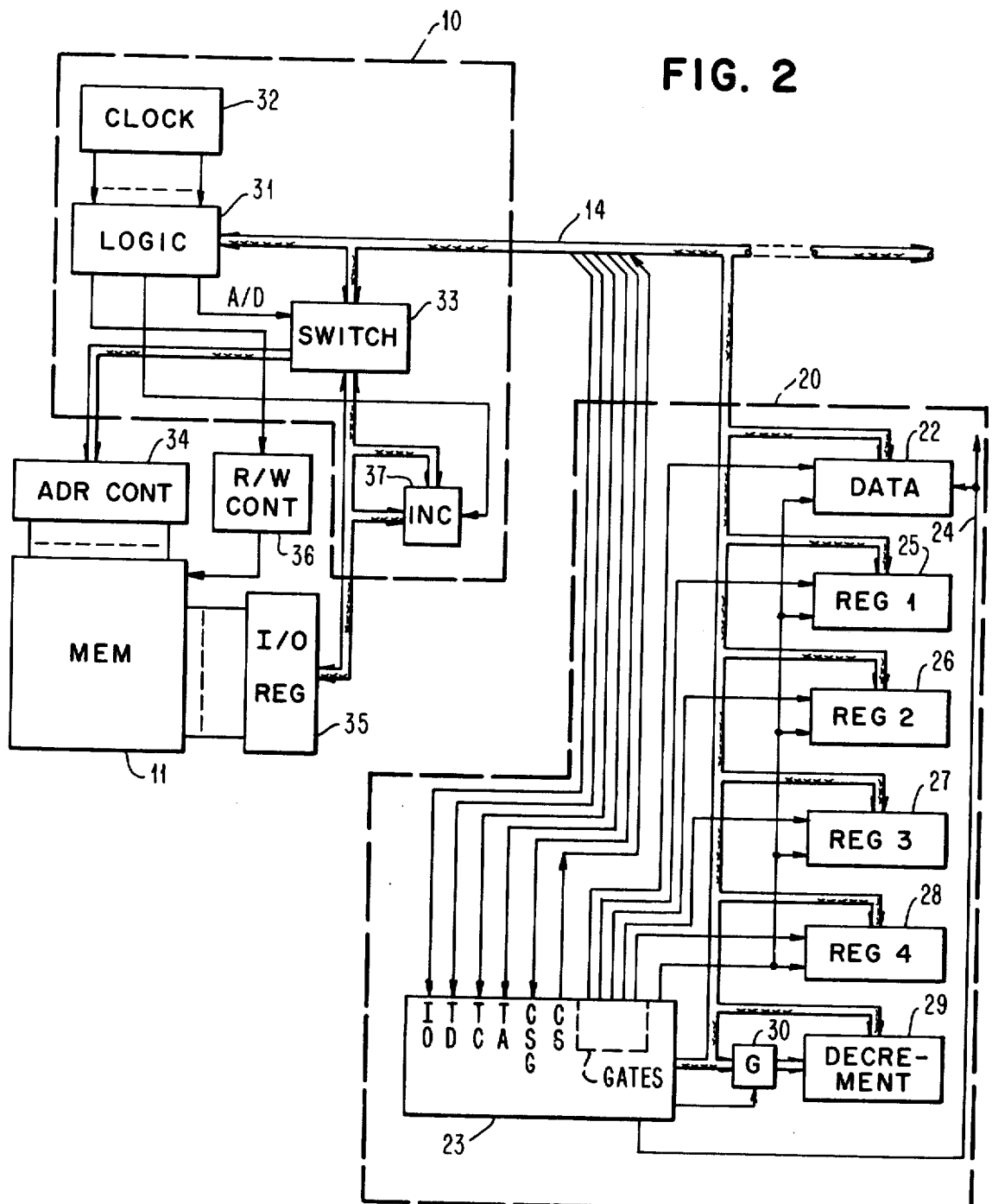
FIG. 2 is a block diagram illustrating the invention.

The subject invention is particularly suitable for use in the above described organization since it substantially reduces the burden on the microprocessor in the transfer of data between the adapter and memory in both directions. This capability is of great value in the case of the communications adapter which in most instances operates synchronously and requires service on a priority basis. That is, if data from the memory is required at a particular time and it fails to arrive, an entire communication would have to be aborted. On the other hand, the adapter 20 must be able to transfer data to memory as fast as it is received; otherwise, data will be lost due to limited data storage in the adapter 20. FIG. 2 illustrates in block form those components in the adapter 20, the processor 10 and the memory 11 which are required to implement the novel data transfer according to the invention. Other components not directly related to the invention have been eliminated in the interest of clarity.

In FIG. 2 reference numerals used in FIG. 1 are also used to identify the location with respect to FIG. 1 of the various components. The adapter 20 includes a data register 22 which can receive data from I/O bus 14 in parallel or supply data in parallel thereto under control of a logic circuit 23, the function of which will be described later. In addition, register 22 can receive data serially from a line 24 and supply serial data thereto under control of logic circuit 23. The adapter 20, in addition, includes four registers 25, 26, 27 and 28, each adapted to receive data from or supply data to I/O bus 14 under control of logic circuit 23. A decrementing circuit 29 under control of logic circuit 23 and gate 30 receives the input from I/O bus 14 and provides a decremented value to the bus after a predetermined delay. The purpose of this function will become apparent when the operation of the circuit is described later.

The processor 10 includes logic circuits 31 responsive to clock signals from a clock 32 and the signals on the I/O bus 14 for providing a plurality of control signals. The provided control signals are used to control: a switch 33 for connecting the I/O bus 14 to the address control circuits 34 or the I/O register circuits 35 of memory 11; the read/write control circuits 36 of memory 11; and an incrementing circuit 37 for incrementing the output from register circuit 35, all under the control of the above described control signals.

The I/O bus 14 includes six control lines which interconnect logic circuits 23 and 31. These are labeled in FIG. 2 within block 23. The CS line is changed from one voltage level to another when the adapter wishes to transfer signals to the processor. The CSG line is under control of the processor logic circuits and changed from one voltage level to another when the processor in response to a CS signal is ready to receive signals from the adapter. This line threads through all the adapters in serial. Each adapter has a switch in the series circuit which it controls. When an adapter brings up the CS line, it opens its associated switch in the CSG line, thus preventing the CSG signal from propagating to other adapters further on. In this way, the adapters are given positional priority for transferring signals to the processor. This arrangement is not illustrated since it does not constitute part of the invention. The other four wires are labeled TA, TC, TD and IO. TA identifies data on the I/O bus 14 as being address data. TC identifies control data, and TD identifies information data, and IO is used to indicate that an input or output operation may take place.

In addition to the above, the bus 14 includes eight conductors which may carry information bits or alternatively six address bits and two control bits. One of the control bits indicates Read or Write in the memory at the address specified in the six bit address portion and the other a direct or indirect operation. In a direct operation the information supplied by the adapter is inserted in the pointer registers within the memory and the number of pointer registers is limited to three or five depending on whether duplex or half-duplex operation is used. In an indirect operation the information supplied by the adapter is inserted or removed from the address stored in the pointer register specified in the address portion of the bus.

FIGS. 3 and 4 illustrate the memory 11 contents at two different times. The contents illustrated in FIG. 3 are suitable for describing a transmit operation in which blocks of information signals stored in a plurality of different locations in memory 11 are transferred one address at a time to the adapter 20 for transmission. The information signals in each block are transmitted in the address sequence, and the blocks are transferred and transmitted in the sequence defined by a table stored in memory 11. This figure will be used in conjunction with a description of the operation of FIG. 2 to perform a transmit operation in which the data stored in memory 11 is transferred to the modem 17 for transmission to a remote data processing device or the like.

The data transfer contemplated is initiated by a control program in the processor. The control program assembles the information signals in the memory 11 in a number of different locations as available. This requirement is necessary if efficient utilization of memory 11 is required. For example, in FIG. 3 six different locations having starting addresses 256, 512, 524, 536, 1024 and 1048 are illustrated. The addresses identify the starting address of six variable length blocks of data comprising the message to be transmitted. On a subsequent occasion depending on the state of memory 11, a different number of blocks at different starting locations may very well be used.

In addition, the control program builds a table at starting address 2056 which includes the starting addresses of the six blocks in the order in which they must be transmitted and with each such address, a status or control value and a byte or length count. In addition, the control program loads the starting address 2056 of the table at address 08 which address has been previously loaded in register 3 (27) of FIG. 2. Once the conditions set forth above have been established, a control message (TC) is addressed (TA) to the adapter 20 indicating that a transmit operation (TX) is required.

At this time the logic circuit 23 brings up CS. When it receies CSG, it requests a read indirect at address 08 by placing the contents of register 3 (27, FIG. 2) on the first six conductors of I/O bus 14 and setting R/W conductor of bus 14 to the appropriate voltage level indicating read and likewise for the indirect/direct conductor. The logic 31 in sequence causes a memory read cycle at the address specified (2056) in memory address 08 causing (1048) and (12-2) to be returned to the adapter 20 via bus 14. The adapter logic stores this information in register 4 (28) by generating appropriate gating and control signals. The logic 31 causes address (2056) to be incremented and restored in address 08.

In the next cycle of operation logic 23 causes address 1048 from register 4 to be transferred direct to address 04 which had previously been stored by the control program in register 1 (25). At this time address 04 contains the starting address of the first block of data which in this instance is two bytes. At this time logic circuit 23 causes two successive indirect read operations to take place at address 04 and the 1048 is incremented when this takes place to thus transfer the two bytes of data. The logic circuit 23 causes the count of (2) stored in register 4 (28) to decrement to zero. When the count reaches zero, a read indirect operation pointing to address 08 is performed. This results in the next address 256 and byte count 2 to be transferred to register 4 in adapter 20, whereupon the process described above is repeated. In the manner described above, the blocks starting at 512, 524, 536 and 1024 are transferred byte by byte to the adapter 20 and transmitted via the data register 22. The data bytes are inserted in register 22 in parallel and shifted out serially to the modem under control of logic circuit 23.

The control character 3 (FTA) in address 2056-12 following the transfer of 12 bytes, indicated therewith, causes the adapter 20 via a series of indirect read and direct write operations to transfer address 1200, 1216 and 1400 to address pointer registers 04, 06 and 08, as illustrated in FIG. 4, to prepare the adapter 20 to perform a receive operation in which data from the modem 17 will be transferred into the memory 11. Typically, in a half-duplex data transmission operation a transmit cycle will be followed by a receive cycle. The arrangement described above is particularly suitable for use in a half-duplex environment since it facilitates a fast turn-around. This is made possible since the pointer registers are loaded with the appropriate addresses for receiving data by the adapter when needed without waiting for control program intervention.

In addition, a full-duplex operation may be employed. In such a case two sets of pointer registers, one with two and one with three, would be required and the number of registers in the adapter 20 would experience an increase in number to permit simultaneous operation as described above and below. However, half-duplex operation is used extensively in the interactive data transmission environment and was, therefore, chosen for illustration. The changes necessary to implement a full-duplex operation are obvious in view of the half-duplex description which covers both functions occurring in mutually exclusive time periods as opposed to simulaneously.

In a receive operation data from the modem 17 is inserted serially in data register 22. After eight bits have been received, the data must be transferred to memory 11; otherwise, the data will be lost. Register 22 may be arranged to include two bytes of data. If this is done, the adapter has eight bit times to effect the transfer of a byte to memory 11 before data will be lost. If, on the other hand, only one byte of storage is provided, the transfer must be effected in one bit time.

When logic circuits 23 determine that a byte of data is received in data register 22 and is ready for transfer to memory 11, it points to pointer register 04 via register 1 (25) as described above with write indirect signals on the bus until the fixed length contiguous register space starting at address 1200 is exhausted and then switches by pointing to address 06 via register 2 (26) and fills that space. In the meantime, it builds a receive table starting at address 1400 as needed. This is accomplished by accessing pointer register 08 via adapter register 3 (27) and doing a write indirect operation storing appropriate codes in the address starting with 1400. Typically, the table will include status information relative to data blocks such as start, length of block, stop, etc. In addition, the table will include an entry whenever the block starting at 1200 or 1216 is filled. As described above, the addresses stored at 04, 06 and 08 are incremented when accessed by the adapter.

The control program periodically scans the receive control list to determine when one of the storage blocks is full or any other appropriate status condition. At this time it may assign another block by inserting a new starting address in the appropriate pointer register or transfer the data and reinsert the original starting address of the block in the appropriate pointer registers.

Figure 5:
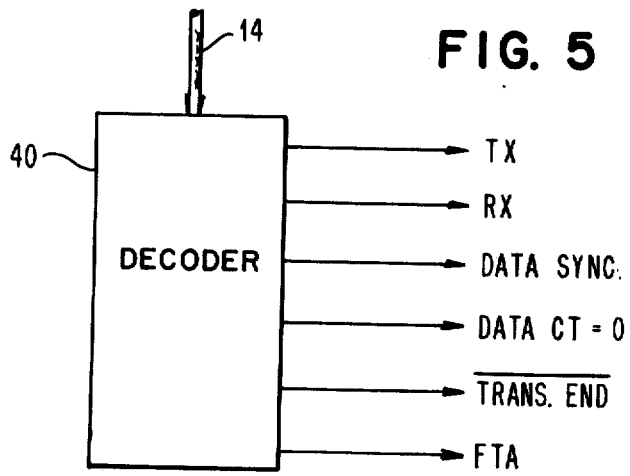

FIGS. 5-13 illustrate in greater detail the adapter logic 23 and may be used in conjunction with the above description of FIGS. 2-4. In FIG. 5 a decoder 40 is connected to bus 14 and provides the six signals identified. Decoder 40 is conventional and may include nothing more than AND gate logic responsive to the signals previously described on bus 14. The TX (transmit) and RX (receive) signals are provided by the control program in the processor. These signals when received are latched and in a half duplex operation are mutually exclusive. The Data Sync signal (DATA SYNC) is derived from the contents of Data Register 22 when in receive mode (RX). The signals DATA CT = 0, FTA, and $\overline{\text{TRANS END}}$ (not transmit end) are decoded from the contents of REG 4 (28), FIG. 2. The $\overline{\text{TRANS END}}$ signals FTA are status signals loaded by the control program and described above. The DATA CT = 0 signal is derived by decrementing the count stored in REG 4 to zero as described above.

In FIG. 6 the data clock signal supplied by the modem in receive mode is applied to the clock input of a counter 41 which is arranged to count on a modulus of eight which corresponds to eight bit bytes or characters. The DATA SYNC signal from decoder 40 is applied to the reset input of counter 41 to cause the BYTE SYNC signal from counter 41 to coincide with the byte or character boundaries.

Boolean expression 1 in FIG. 7 indicates the conditions under which the logic 23 will set the indirect/direct bit on to indicate indirect. The terms A and B are derived and defined later. This bit is set to off as its normal condition and is turned on under the conditions set forth in expression 1. Expression 2 defines when the read bit is turned on. This bit is normally off to indicate write.

The Boolean expression in FIG. 8 defines the conditions under which the adapter 23 generates the CS signal to institute a byte transfer in either the transmit mode or the receive mode.

Figures 9, 10:
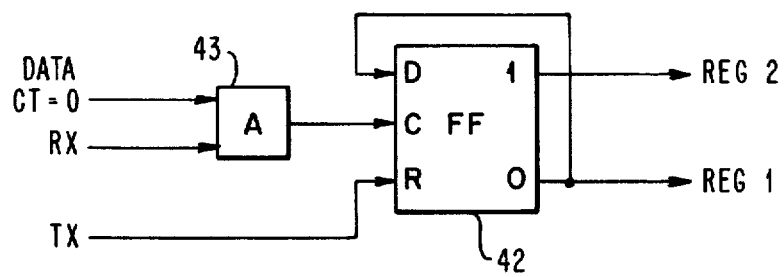

The circuit illustrated in FIG. 9 is used to determine which of REG 1 or REG 2 is to be used in the receive mode when data is being transferred from the adapter to the memory in the half duplex environment. The TX signal is applied to the reset input (R) of a flip-flop 42. The zero output of the flip-flop is connected to the data input D and DATA CT = 0 and RX are connected to the clock input C by an AND gate 43. Thus, in receive mode the flip-flop will change state each time data count equals zero and transmit mode will cause the REG 1 or zero output to be up.

The Boolean expressions set forth in FIG. 10 define the generation of intermediate values which are used later to define the generation of the register read/write control signals shown in FIG. 2. This technique was chosen to simplify understanding the generation of the signals used to control reading and writing in registers 22, 25, 26, 27 and 28.

The circuit illustrated in FIG. 11 receives as inputs the TX, CS and DATA CT = 0 signals and provides the A and B signals referred to above. The circuit includes two flip-flops 44 and 45. The DATA CT = 0 signal is applied directly to the reset inputs (R) of both flip-flops. The zero output of flip-flop 44 and TX are connected to an AND gate 46 which has its output connected to the (D) input of flip-flop 44. The one outputs (A and B) of flip-flops 44 and 45 are connected to an AND gate 47 which has its output connected via an inverter 48 to one input of an AND gate 49. The signal CS is connected to the other input of AND gate 49.

The circuit, at DATA CT = 0, provides $\bar{A} \cdot \bar{B}$. The occurrence of TX, a first CS, and $\overline{DATA\ CNT = 0}$ changes the output to $A \cdot \bar{B}$. A second CS causes the output to become $\bar{A} \cdot B$. A third CS changes the output to $A \cdot B$. Subsequent CS signals received prior to another DATA CT = O do not change the output from $A \cdot B$. When a subsequent DATA CT = 0 is received, both flip-flops are reset changing the output to $\bar{A} \cdot \bar{B}$ and the above cycle or sequence is repeated.

Figures 13, 14:
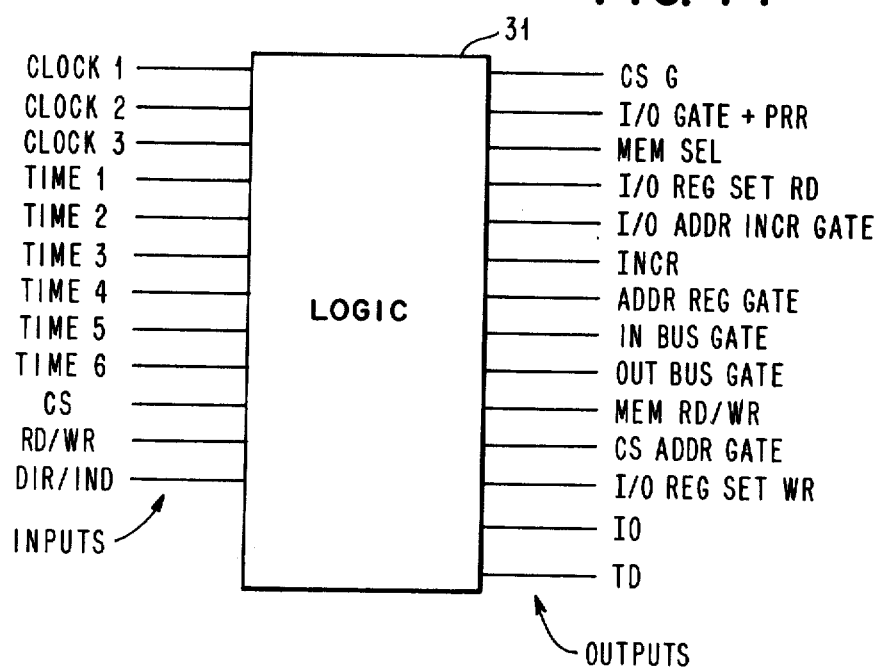
Figure 15:
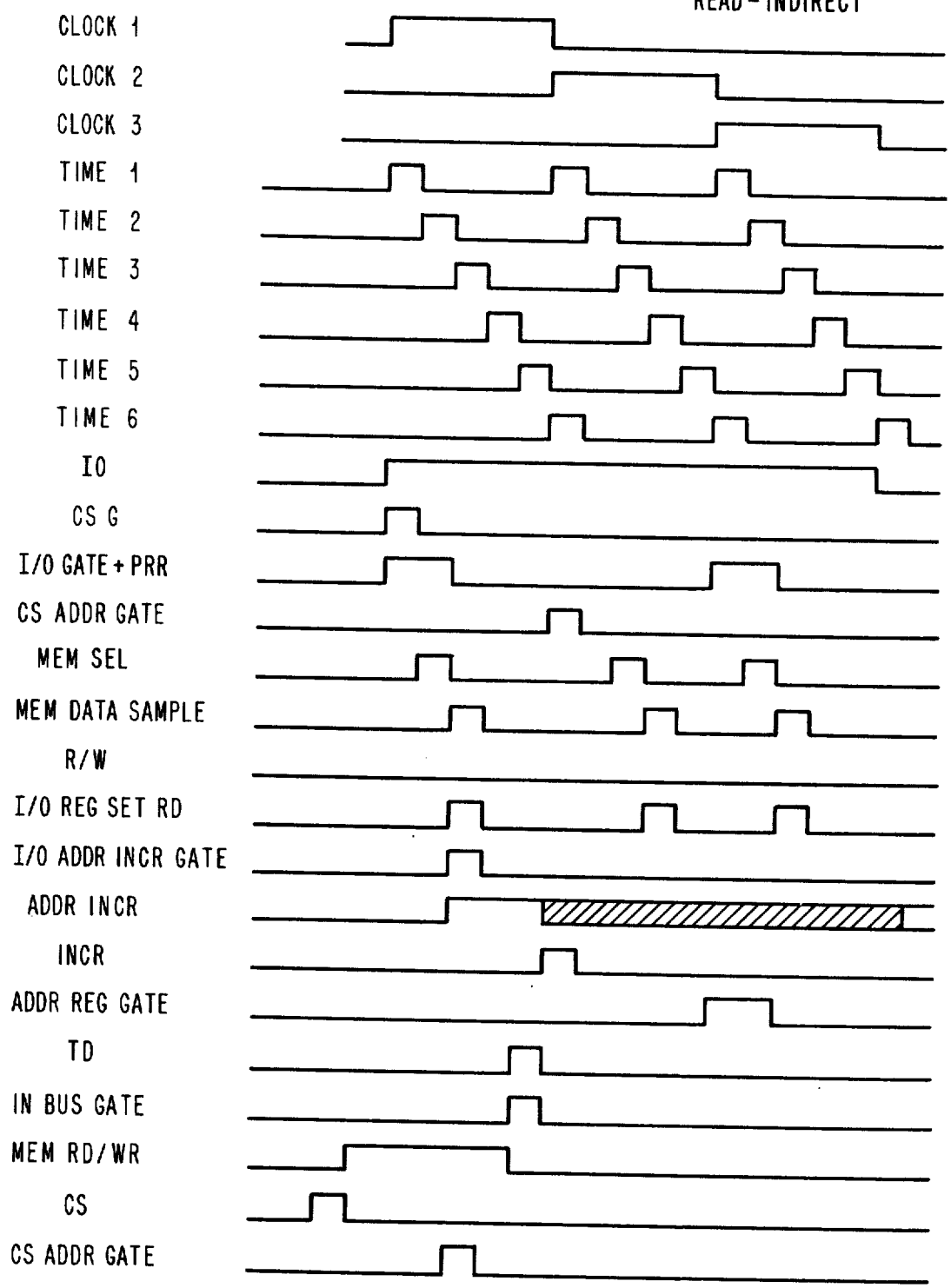
Figure 16:
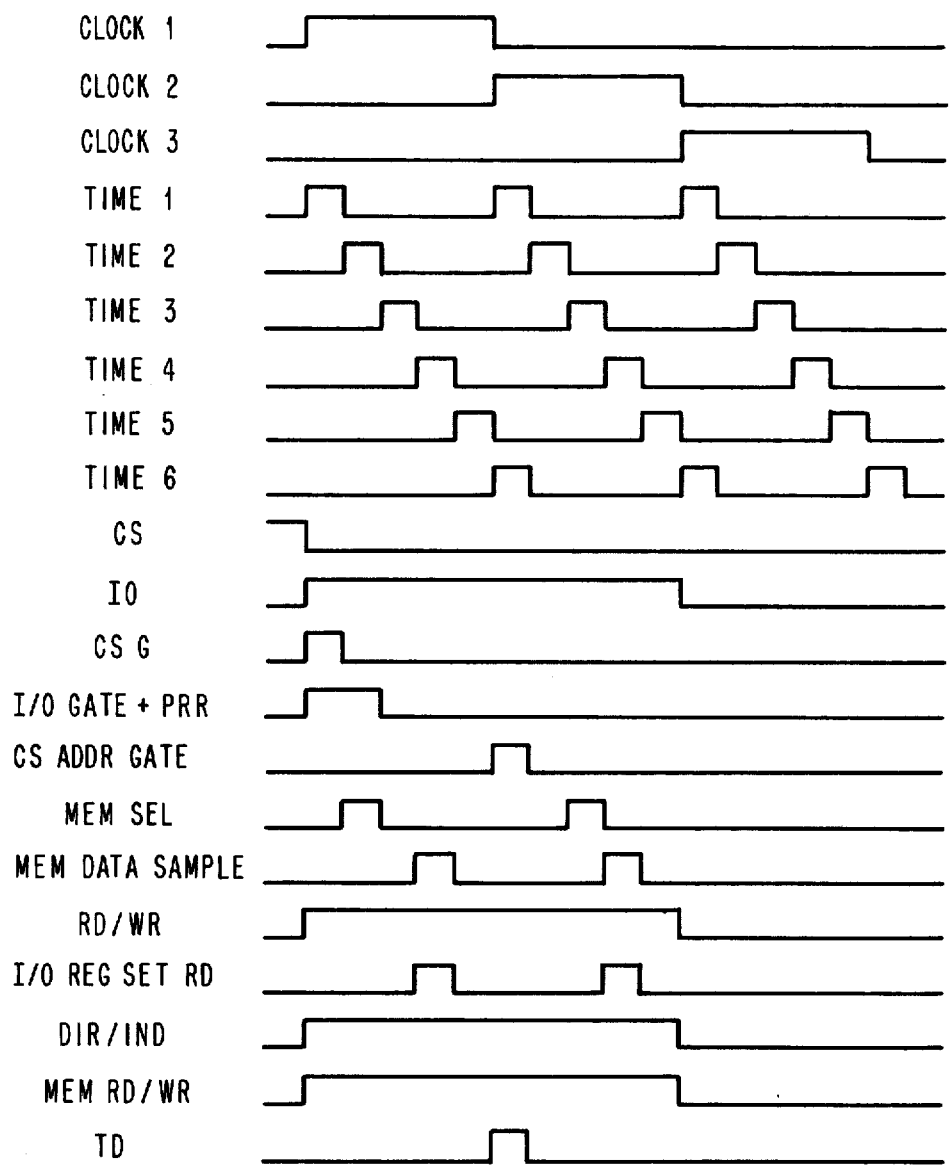
Figure 17:
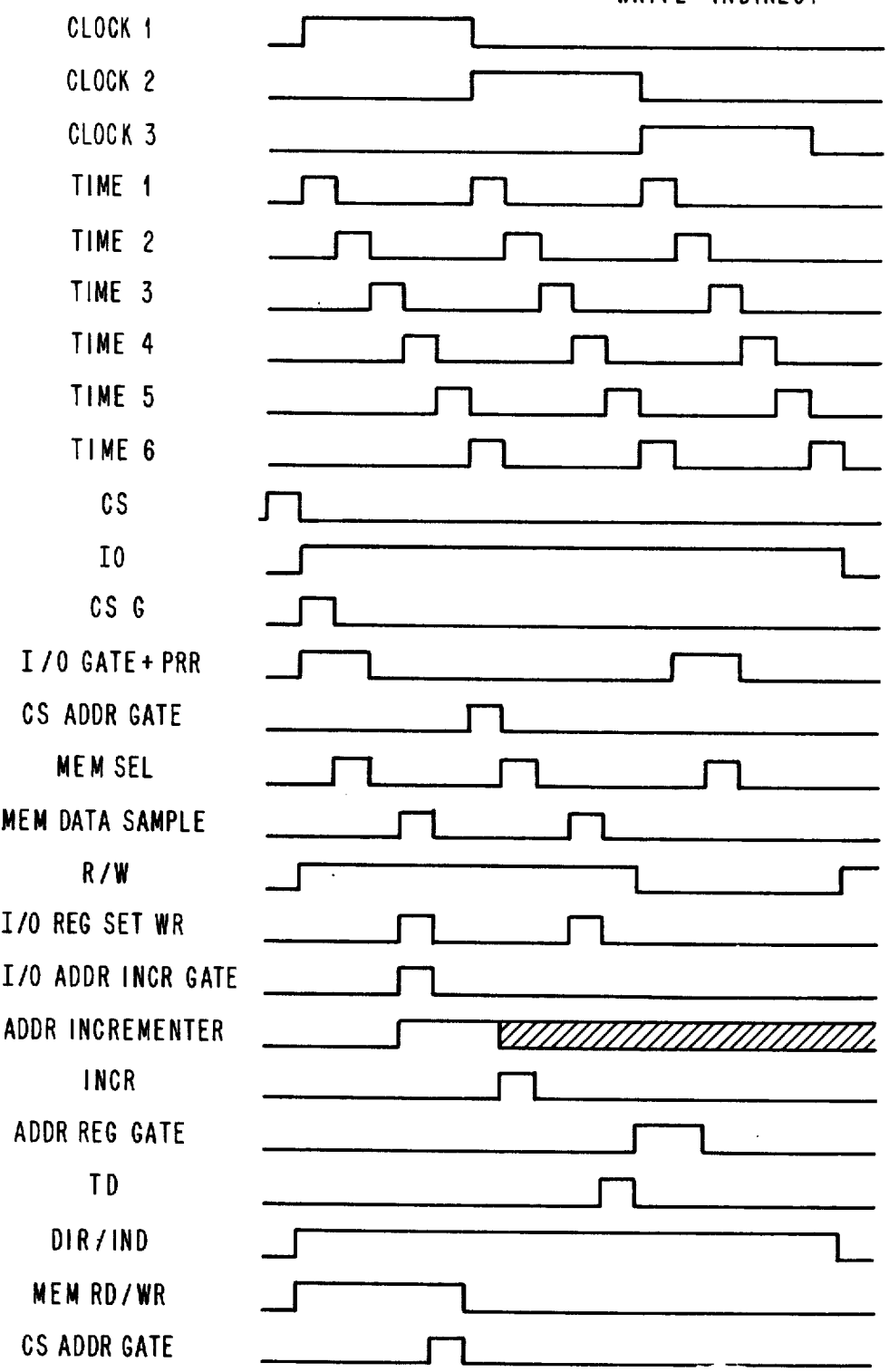

The Boolean expressions set forth in FIG. 12 define the generation of intermediate values which are used along with those defined in FIG. 10 to generate the register read and write control signals illustrated in FIG. 13 in Boolean form.

FIGs. 14-18 illustrate in greater detail the logic in the processor and the input/output and address registers for the memory. FIG. 14 illustrates the inputs and outputs generated therefrom by logic circuit 31. These inputs and outputs are illustrated graphically in FIGS. 15, 16 and 17 which show memory cycles for read indirect, read direct and write indirect, respectively. The logical derivation of the output signals from the input signals and the internal signals is obvious from the timing diagrams illustrated in FIGS. 15, 16 and 17. The hatched areas in FIGS. 15 and 17 indicate that either state is acceptable at the time indicated for that signal.

Figure 18:
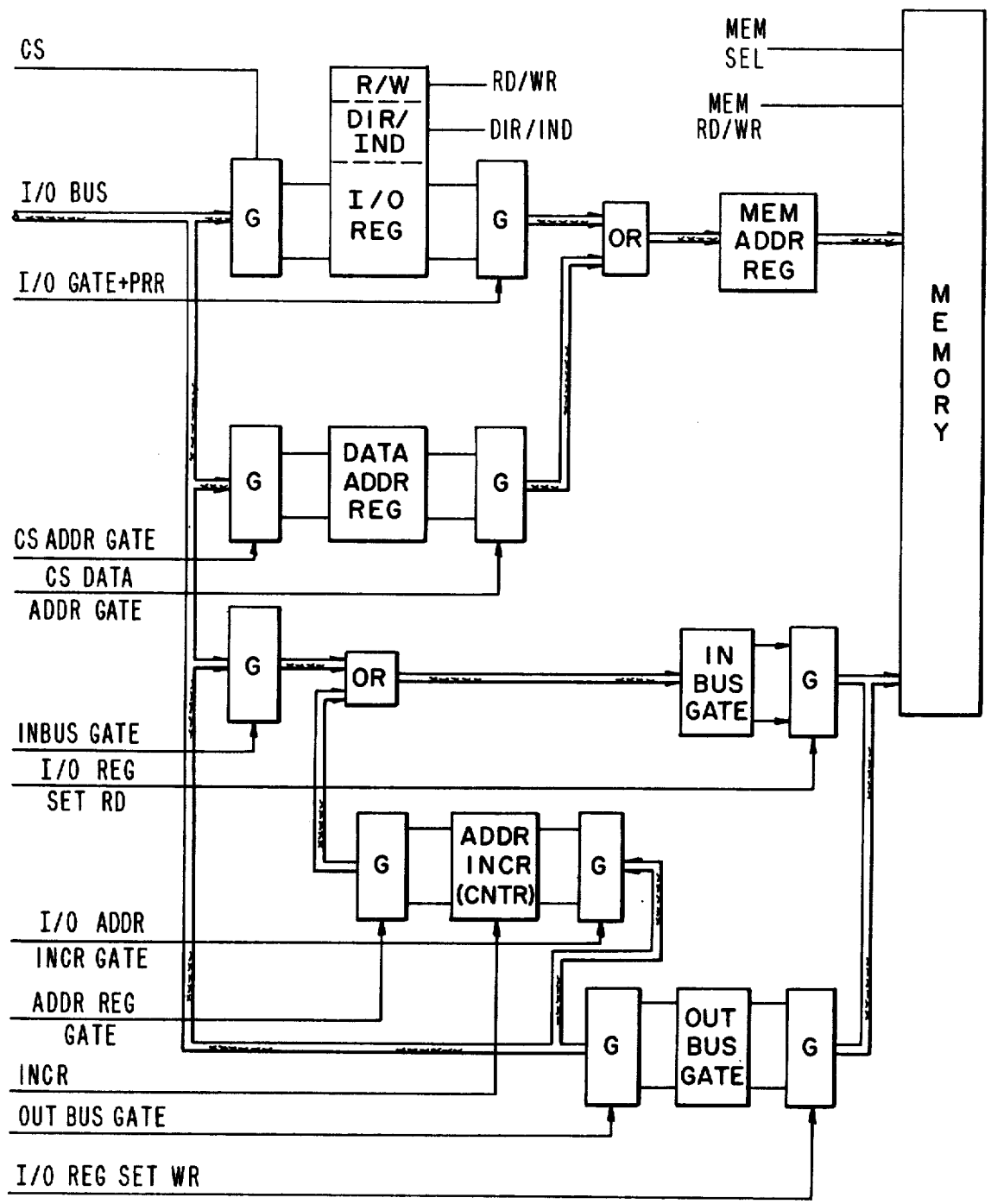

FIG. 18 is an expanded view of the address and I/O bus registers for the memory and their associated gates and gate control signals. In addition, it illustrates the greater detail the address incrementing function. The operation of the circuit is identical to the description above in connection with FIG. 2.

While the invention has been particularly shown and described with reference to a preferred embodiment thereof, it will be understood by those skilled in the art that various changes in form and details may be made therein without departing from the spirit and scope of the invention.

What is claimed is:

1. An output channel system for transferring data blocks and control information stored in several different locations in a memory connected to a data processor to a device comprising:
   at least two pointer registers in the data processor, a first of which includes the address in memory of the first control information,
   a control channel interconncting the pointer registers and the device,
   a data channel interconnecting the memory and the device,
   first means connected to the device for accessing the address stored in the first pointer register to cause the memory contents of that addressed location to be transmitted over the data channel to the device, the control information including:
   the first address in memory containing data to be transmitted,
   a count field indicating the number of consecutive addresses in memory having data to be transmitted and control bits indicating the status of the data contained in the consecutive addresses in memory; and
   means for incrementing said first address in the first pointer register,
   second means connected to the device for transferring the received first address to the second pointer register which includes means for initiating a write operation in the memory at the transferred address to cause the data stored at said first address to be transferred to the device via the data channel and means for incrementing the address inserted in the second pointer register after said data transfer and means for decrementing the count stored in the device after said data transfer, means for repeating the data trasfer sequence until the number stored in the count field is reduced to zero and means for thereafter repeating the entire sequence set forth above until all the control bits have been received, so as to indicate that all data has been transferred to the device.

2. A channel system for transferring data from a device to at least two different memory locations having predetermined storage capacities in a memory connected to a data processor and for compiling in the memory under control of the device, a list of control information relating to the data stored comprising:
   at least three pointer registers in the data processor for storing an address of a location in memory indicative of the storage location of the list of control information, an address indicative of the storage location of a first of the at least two different memory locations for storing the transferred data, and an address indicative of the storage location of a second of the at least two different memory locations for storing the transferred data;
   first data processor means for incrementing the the addresses stored in said pointer registers on an individual basis each time the device accesses the individual pointer register;
   first device means for receiving and storing the addresses of the pointer registers which includes means for accessing the pointer register initially containing the address of the first storage location each time data is to be transferred to storage and means for maintaining a count of the data so stored for indicating when the storage capacity is exhausted;

second device means for accessing the pointer register initially containing the address of the second storage location each time data is to be transferred to storage after the first storage has been exhausted which includes means for maintaining a count of the data stored in the second store for returning control to the first device means when the second storage capacity has been exhausted;

third device means for accessing the pointer register initially including the first address of the control list which includes means for periodically referencing said control list for storing status information related to data trasfered and stored and fourth device means for generating and transferring a control message to the data processor including each time the first or second data storage location is exhausted.

* * * * *